United States Patent [19]  [11] 4,307,873
Möders  [45] Dec. 29, 1981

[54] CYLINDER AND PISTON DEVICE AND A METHOD FOR THE ASSEMBLING THEREOF

[75] Inventor: Werner Möders, Plaidt, Fed. Rep. of Germany

[73] Assignee: Stabilus GmbH, Koblenz-Neuendorf, Fed. Rep. of Germany

[21] Appl. No.: 158,393

[22] Filed: Jun. 11, 1980

[30] Foreign Application Priority Data

Jun. 26, 1979 [DE] Fed. Rep. of Germany ....... 2925642

[51] Int. Cl.³ .............................. F16F 9/18; F16F 9/34
[52] U.S. Cl. ................................. 267/64.15; 267/124; 188/297
[58] Field of Search ...................... 267/120, 124, 64 R, 267/65 R; 188/269, 322, 317, 281, 282, 284

[56] References Cited

U.S. PATENT DOCUMENTS

| 3,311,199 | 10/1965 | Kiefer | 188/317 |
| 3,937,450 | 2/1976 | Bauer | 267/65 R |
| 4,089,512 | 5/1978 | Allinquant et al. | 267/65 R |
| 4,240,619 | 12/1980 | Wirges et al. | 267/120 |

FOREIGN PATENT DOCUMENTS

| 1127201 | 9/1968 | United Kingdom | 128/234 |
| 1286168 | 9/1970 | United Kingdom | 414/689 |

Primary Examiner—Douglas C. Butler
Assistant Examiner—Thomas J. Brahan
Attorney, Agent, or Firm—Brumbaugh, Graves, Donohue & Raymond

[57] ABSTRACT

In the illustrative embodiments described, a cylinder-piston device such as a gas spring includes a novel piston rod-piston unit assembly which embodies a snap-on type construction for facilitating the connection and disconnection of the piston unit to and from the piston rod. Resilient tongue members carried by the piston unit are formed with detent-like abutment members at their free ends, which abutment members snap behind an engagement shoulder, formed for example by a disc or groove, on the piston rod to hold the piston unit on the rod. The free ends of the tongue members are also formed with bevelled surfaces which coact with the piston rod to cam the tongue members radially outward as the piston unit is urged onto the piston rod, so that the abutment members are first displaced away from and then snap behind the abutment shoulder. Once the piston rod-piston unit assembly is in place within the cylinder, the inner surface of the cylinder prevents the tongue members from deflecting outward enough for the abutment members to be free of the abutment shoulder. The piston unit may be slidably on the piston rod between two axial terminal positions at which the piston unit and rod together define two different damping flow cross sections.

22 Claims, 5 Drawing Figures

CYLINDER AND PISTON DEVICE AND A METHOD FOR THE ASSEMBLING THEREOF

BACKGROUND

1. Field of the Invention

The present invention relates in general to pneumatic, hydraulic, and hydropenumatic piston/cylinder devices and pertains in particular to an improved piston unit and piston rod structure for such devices and to and improved method of assembly of the piston unit and piston rod to one another and within the cylinder.

2. The Prior Art

It is known in prior art cylinder-piston devices, as illustrated by U.S. Pat. No. 4,089,512 for instance, to mount a piston unit on the inner end of a piston rod unit for axial movement therealong between two axial limiting positions defined by abutment surfaces carried by the piston rod. The axially-outermost abutment surface is positioned on the piston rod before the piston unit has been mounted on the piston rod. Whenever disassembly of the piston unit and the piston rod are required, e.g. for repair, however, it is necessary in such prior art devices to deform the member or members defining the second abutment surface, again by means of a tool. This is not only time consuming, but subjects the piston rod and/or the abutment surface-defining member(s) to wear and possible damage.

SUMMARY

It is therefore an object of the present invention to provide a cylinder-piston device of the type described in which the assembly and, in the case of need, the disassembly of the piston unit and the piston rod is facilitated and no wear or damage to the structure of the device is involved.

It is a further object of the invention to accomplish the foregoing object of facilitated assembly and disassembly while at the same time reducing the cost of manufacture of the cylinder-piston device.

It is a further object of the invention to provide a reliable connection between the piston rod member and the piston unit.

Another object of the invention is to establish the connection of the piston rod member and the piston unit without necessitating permanent deformation of the parts involved.

Another object of the invention is to permit the connection between the piston unit and the piston rod member to be made and unmade without use of shaping tools.

Still a further object of the invention is to provide a combined piston unit-piston rod assembly which consists of only a few parts, and in the most favorable case of only two parts, i.e. the piston rod member and the piston unit.

The foregoing and other objects of the invention are attained, in accordance with the invention, by the provision of cooperative engagement structure on both the piston unit and the piston rod member, at least one of which engagement structures is radially deflectable or displaceable with respect to the longitudinal axis of the cylinder member, when the piston unit is outside of the cylinder member, between a first radial position, at which the cooperative engagement structures are engaged to connect the piston unit to the piston rod member, and a second radial position, at which the cooperative engagement structures are disengaged. Preferably the cooperative engagement structures also include coacting elements which move the displaceable engagement structure to the disengaged position in response to axial movement of the piston unit onto the piston rod member. One or both of the coacting elements may comprise a bevelled surface inclined with respect to the axis of the piston rod member, so that the displaceable engagement structure will be smoothly deflected when the piston rod member and the piston unit are urged together. This construction greatly facilitates assembly and disassembly of the piston unit on the piston rod member, in that the engagement structures for connecting the piston unit on the rod can be readily engaged merely by sliding the piston unit onto the rod, the displaceable engagement structure thereupon being automatically moved out of the way. As another feature of the invention, the displaceable engagement structure is preferably resiliently biased towards the engaged position. It will therefore automatically return to the engaged position once the coacting elements tending to move it to the disengaged position are no longer in contact.

Advantageously, the piston unit is coaxially mounted on the piston rod member, and appropriate structure may thus be provided on the piston unit and/or the piston rod member for centering the piston unit on the rod.

Although the displaceable engagement structure is readily moved to the disengaged position when the piston unit is outside the cylinder member, to facilitate assembly of the piston unit on the piston rod, the displaceable engagement structure preferably is restrained against movement out of the engaged position while the piston unit is in the cylinder. For simplicity the restraining structure suitably is the inner peripheral face of the cylinder member. By this additional feature, a very reliable connection is achieved between the piston rod member and the piston unit, while the forces necessary for assembly and disassembly are maintained at a minimum.

In a preferred embodiment, the displaceable engagement structure is provided on the piston unit. This is of particular advantage where the piston member itself is composed of a resilient material, such as plastic. In this case, the engagement structure of the piston unit may be integrally formed with the piston member, and the elastic resiliency of the material used for the piston member may then provide the necessary resilience to the engagement structure to bias it towards the engaged position.

According to a simple, yet reliable design, the displaceable engagement structure carried by the piston unit comprises one or more axially extending tongue members which are joined at one end to the piston body and are free at the other end to deflect radially. Each tongue is provided at the free end thereof with a radially directed abutment member which is adapted to engage the engagement structure carried by the piston rod member. Generally a plurality of such axially-extending tongue members are provided and are preferably symmetrically spaced around the axis of the piston unit.

The engagement structure carried by the piston rod member may comprise, according to a first embodiment, an annular engagement member provided on said piston rod member and protruding in the radial direction beyond the circumferential face of the rod. In this embodiment, the annular engagement member suitably is located axially between an axially directed abutment face of the piston unit and the radially inward directed abutment member of the tongue members. According to another embodiment, the engagement structure on the piston rod member may comprise a circumferential engagement groove provided in the circumferential face of the piston rod member. In this case, the radially inward directed abutment member on each tongue member suitably extends into the circumferential engagement groove and is located axially between the end walls of the groove.

While this invention is also applicable to cases where the piston unit is axially fixed with respect to the piston rod unit, it has special utility where the piston unit is capable of limited axial movement relative to the piston rod member so as to move, in dependence on the direction of movement of the piston rod member relative to the cylinder, between two axial terminal positions relative thereto at which the piston unit functions to define two different cross sectional areas for fluid flow across the piston unit. Such movement of the piston unit may therefore afford a different damping rate for each direction of movement of the piston rod. The fluid passage leading across the piston unit may comprise one or more fluid channels extending axially through the piston unit, and cooperating faces may be provided on the piston rod member and the piston unit, respectively, to open and close the fluid channels at the respective terminal positions to afford the different damping rates. The cooperating face carried by the piston unit preferably is defined by an annular rib provided on the piston body and shaped integrally therewith.

The piston unit preferably establishes sealing contact with the inner circumferential face of the cylinder member, and this is preferably achieved by providing the body of the piston unit with an annular sealing lip shaped integrally therewith and engaging the inner circumferential face of the cylinder member. This sealing arrangement is especially useful in applications where the piston member is made of plastic material.

The invention further affords an improved method of assembling the piston unit and the piston rod member into a combined assembly. According to this method, the piston unit is mounted on the piston rod member outside the cylinder cavity by axially moving the piston unit with respect to the piston rod member until the piston unit reaches an axial position with respect to the piston rod at which the cooperative structures on the two components are brought into mutual engagement. As mentioned, this may readily be done simply by sliding the piston unit onto the piston rod unit, the respective engagement structures then automatically coming into engagement with comparatively little force. Thereafter the combined unit consisting of the piston rod and the piston unit is inserted into the cylinder, so as to secure the engagement of the cooperative engagement structures to one another by virtue of the restraining function of the wall of the cylinder.

BRIEF DESCRIPTION OF THE DRAWINGS

For a better understanding of the invention, reference may be made to the following description of exemplary embodiments thereof, taken in conjunction with the accompanying drawings, in which.

DETAILED DESCRIPTION

The cylinder-piston device of the present invention has special utility as a pneumatic spring, i.e., in which the cylinder is closed at one end and is provided with an annular end wall at the other end for passage therethrough, in sealed relation, of the piston rod, and in which the cylinder cavity is filled with a pressurized gas. Such gas springs are useful, for example, to move the cover members of motor cars, e.g. trunk lids, hoods, sun-roofs, etc., which are swingable about pivotal axes between a closed position, in which they cover a cavity in the motor car body, and an open position, in which they permit access to the cavity. One or more gas springs may be connected between the motor car body and the cover member for facilitating the movement of the cover member with respect to the motor car body by hand, or for stabilizing the cover member in a selected position relative to the car body. In this field of use, it is frequently desired to vary the damping action of the piston unit and, therefore, it is important according to one feature of the invention that the damping characteristic of the spring may be changed as a function of the relative direction of movement of the cylinder member and the piston rod member. This is accomplished, in accordance with the invention, by providing for limited axial displacement of the piston unit with respect to the piston rod unit between two end positions, at which end positions the piston unit affords two different damping rates. The preferred embodiments of the invention, therefore, are described herein in the context of gas springs having a differential damping rate capability. It will be understood, however, that this is for illustrative purposes only, and that the invention has application broadly to hydraulic cylinder-piston devices and hydropneumatic cylinder-piston devices, as well as to cylinder-piston devices which have only a single damping rate, or which provide a differential damping rate but without the use for that purpose of a displaceable piston unit.

Figure 1:
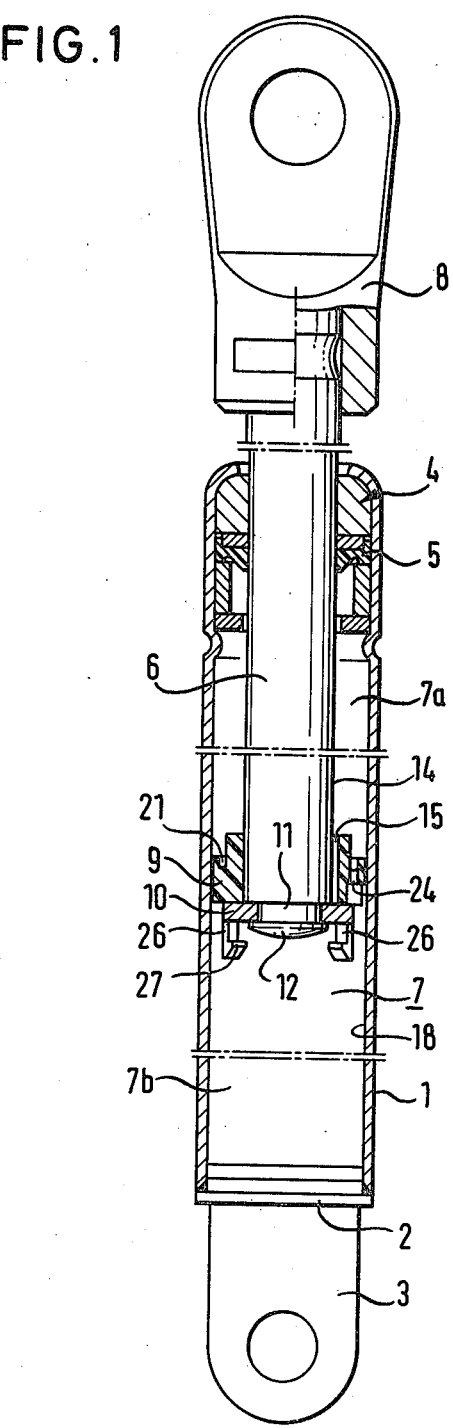
FIG. 1 is a longitudinal sectional view of one embodiment of a gas spring constructed in accordance with the invention.

In the embodiment of FIG. 1, the cylinder member 1 is closed at its one end by an end wall 2 and is provided at the other end with an annular closing assembly 4, which includes a sealing member 5 of elastomeric material. A piston rod member 6 extends through the annular closing assembly 4 inward and outward of the cavity 7 defined within the cylinder member 1 and is sealed against gas leakage therealong by the sealing member 5. Fastening brackets 3 and 8 of conventional design are provided on the outer ends of the end wall 2 and the piston rod 6, respectively.

A piston unit indicated generally by the numeral 9 and preferably made of plastic material, such as nylon, is mounted on the inner end of the piston rod member 6. As shown in FIG. 1, an annular engagement disc 10 is fixed in a positioning groove 11 at the inner end of the piston rod member 6. For ease of manufacture, the positioning groove 11 may be defined simply by the shank and head 12 portions of a rivet, bolt, or the like, fastened to the piston rod 6. Alternatively, the groove 11 could take the form of a reduced-diameter portion of the piston rod 6 that is bounded at the axially inner side thereof by a rivet or bolt.

Figure 2:
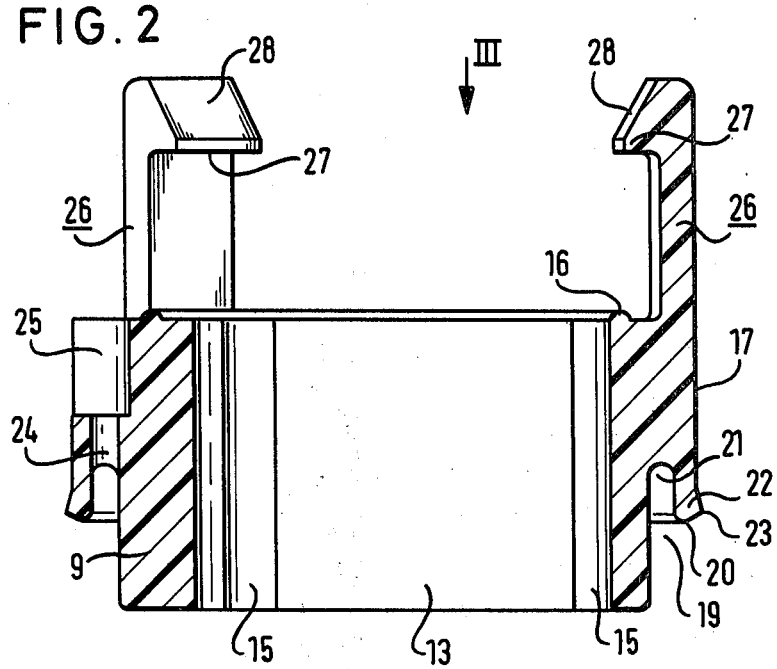
FIG. 2 is an enlarged sectional view of the piston assembly of FIG. 1, taken along the line II—II of FIG. 3 and looking in the direction of the arrows.
Figure 3:
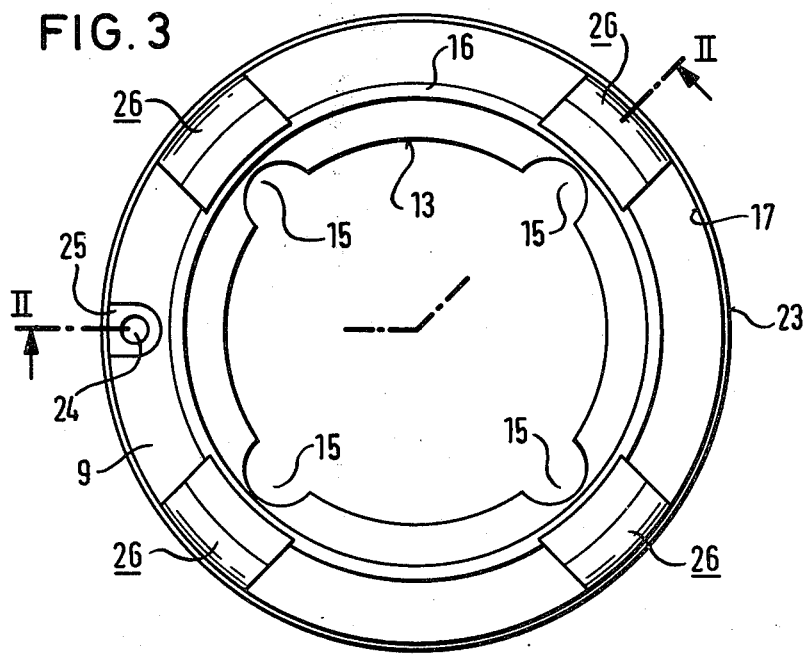
FIG. 3 is an enlarged end view of the piston member of FIG. 2, taken in the direction of the arrow III in FIG. 2.

The piston unit 9 is shown in more detail in FIGS. 2 and 3, where it may be seen that the unit is formed with an axial bore 13 that is adapted and sized to slide over the the outer circumferential face 14 of the piston rod member 6 (as shown in FIG. 1). For purposes described hereinafter, a plurality of circumferentially-spaced axial flow channels 15 are provided in the inner circumferential face of the axial bore 13 and an annular rib 16 is formed on the upper (as seen in FIG. 2) end of the piston unit 9. The diameter of the outer circumferential face 17 of the main body of piston unit 9 is preferably equal to or slightly smaller than the inner diameter of the inner circumferential face 18 of the cylinder member 1 (as shown in FIG. 1), whereas the lower (as seen in FIG. 2) part of the piston unit 9 is suitably reduced in diameter to define an annular recess 19 extending around the piston unit. The shoulder face 20 defined by the annular recess 19 is formed with an axially-directed annular groove 21 that extends from the shoulder face 20 into the body of the piston unit 9, thereby defining an annular lip 22. The radially outward edge 23 of the lip 22 establishes sealing engagement with the inner face 18 of the cylinder 1 when the piston unit 9 is inserted within the cylinder.

With reference again to FIGS. 2 and 3, the piston unit 9 is also provided with an axial bore 24 which opens at its lower end into the annular groove 21 and which opens at its upper end into an axially directed recess 25 in the outer circumferential face 17 of the piston unit. The unit 9 is further provided with four upwardly-directed (as seen in FIG. 2) tongues 26. These tongues 26 are provided at their upper ends with radially-inwardly directed abutment members 27 and bevelled deflecting faces 28. Preferably, though not necessarily, the tongues are made of the same material as and are formed integrally with the main body of the piston unit 9 so as to depend therefrom in cantilevered fashion.

As may be understood from FIG. 1, the piston rod 6 and the piston unit 9 are assembled to one another before the piston rod member 6 is introduced into the cylinder member 1 and before the fastening member 8 is fixed to the piston rod member 6. This is done by sliding the piston unit 9 axially over the upper (as seen in FIG. 1) end of the piston rod member 6 with the tongues 26 directed downward. Upon engagement of the bevelled deflecting faces 28 with the annular engagement disc 10, the unit 9 is pushed further downward until the tongues 26 are progessively deflected in radial outward direction and the abutment members 27 snap radially inward below the engagement disc 10. Thereafter, the piston rod 6 may be introduced into the cavity 7 together with the piston unit 9. The annular closure assembly 4 is then positioned within the upper end of the cavity 7 and fixed therein by inward deformation of the upper edge of the cylinder member 1, as is conventional. In accordance with the invention, the cross sectional size of the piston unit 9 is preferably related to the internal diameter of the cylinder 1 so that the tongues 26, once snapped over the disc 10 and inserted within the cylinder, are prevented by engagement with the cylinder wall from again deflecting outward sufficiently to allow the abutment members 27 to be released from behind the disc 10. Thus, the engagement of the inwardly-directed abutment members 27 with the disc 10 cannot be released, even under substantial axial forces, during use. By thus locking the abutment members 27 in the engagement position through use of the inner face of the cylinder 1, a very reliable connection is achieved between the piston unit 9 and the piston rod 6 while, at the same time, the forces required for assembly and disassembly of the piston unit and piston rod are kept to a minimum.

When the piston unit 9 is in the position shown in FIG. 1, which it assumes when the piston rod member 6 is moved upward (as seen in FIG. 1) due to the frictional engagement of the annular lip 22 with the inner circumferential face 18 of the cylinder, the annular rib 16 on the lower end of the piston body is in sealing engagement with the upper surface of the disc 10. As will be understood, the piston rod member 6 will normally be biased in the outward direction by an outwardly-directed force proportional to the product of the gas pressure with the cavity 7 and the cross section of the piston rod member 6 and, during such outward movement of the piston rod 6, the piston member 9 will thus be in the position of FIG. 1. In this position, the annular engagement disc 10 is in sealing engagement with the annular rib 16, so that the axial channels 15 are closed and the gas can flow from the chamber 7a to the chamber 7b only through the bore 24. Because of the comparatively small cross section of the bore 24, the outward movement (upward movement as seen in FIG. 1) of the piston rod member 6 is damped, as will be apparent to those skilled in the art.

When, under an external downwardly-directed force exceeding the outwardly-directed force exerted on the rod 6 by the gas within the cylinder 1, the piston rod member 6 is moved downward (as seen in FIG. 1) against the biasing force of the pressurized gas, the piston unit 9 shifts axially relative to the rod 6 until the abutment members 27 engage the lower surface of the disc 10. In this position of the piston unit 9, the channels 15 are open and a less, or even negligible if desired, damping effect is achieved.

It is to be noted that the gas pressure in the chamber 7a urges the annular lip 22 in the radially-outward direction into engagement with the inner circumferential face 18 of the cylinder, thereby improving the sealing effect during outward movement of the piston rod member 6. During such outward movement, the pressure in chamber 7a will somewhat exceed the pressure in the chamber 7b, and this further contributes to the enchancement of the seal between the lip 22 and the cylinder wall.

Figure 4:
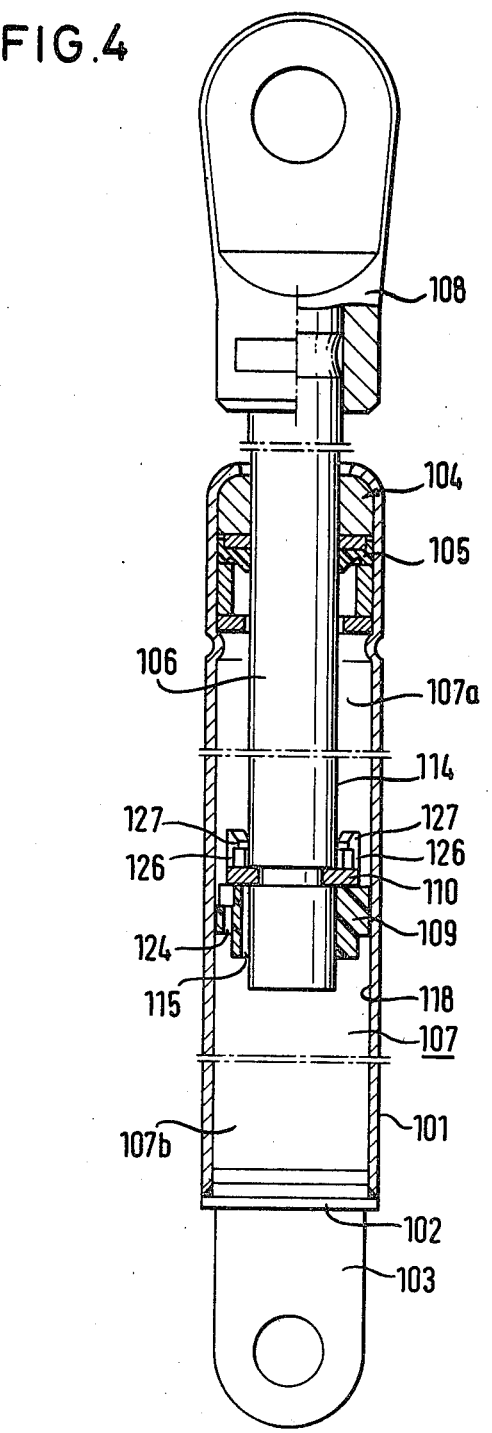
FIG. 4 is a longitudinal sectional view of a second embodiment of the invention.

In the embodiment of FIG. 4, analogous parts are designated with the same reference numbers as in the embodiment of FIGS. 1 to 3, increased by 100. Except as noted below, the two embodiments operate in essentially the same manner.

As shown in FIG. 4, the piston unit 109 is inverted with respect to that of FIG. 1 and the engagement disc 110 is positioned nearer to the outer end of the piston rod member 106 than in FIG. 1. Also, in this embodiment the piston unit 109 is mounted from the lower end of the piston rod member 106 before the piston rod member 106 is inserted into the cavity 107. The groove for receipt of the disc 10 suitably is machined directly in the surface of the piston rod member. Otherwise the embodiment is similar to that of FIGS. 1 to 3. If desired, the annular recess 21 shown in the piston unit 9 in FIG.

2 may be omitted from the piston unit 109, and indeed the recess is not illustrated in FIG. 4.

FIG. 4 depicts the relative positions of the piston unit 109 and the piston rod member 106 during inward movement of the piston rod. During outward movement, the engagement disc 110 engages the abutment members 127. It is to be noted, therefore, that in this embodiment it is the inward movement of the piston rod member 106 that is highly damped and the outward movement that is less damped. That is to say, during inward movement (illustrated in FIG. 4) the channels 115 are closed and during outward movement the channels 115 are open. The damping arrangement of FIG. 4 is useful, for example, where a gas spring is used only to assist the opening of a cover member by hand, but where it is not designed to have sufficient force to overcome the full weight of the cover member. In this case, it is normally the closing movement of the cover member, corresponding to the inward movement of the piston rod member 106, that is to be damped.

Figure 5:
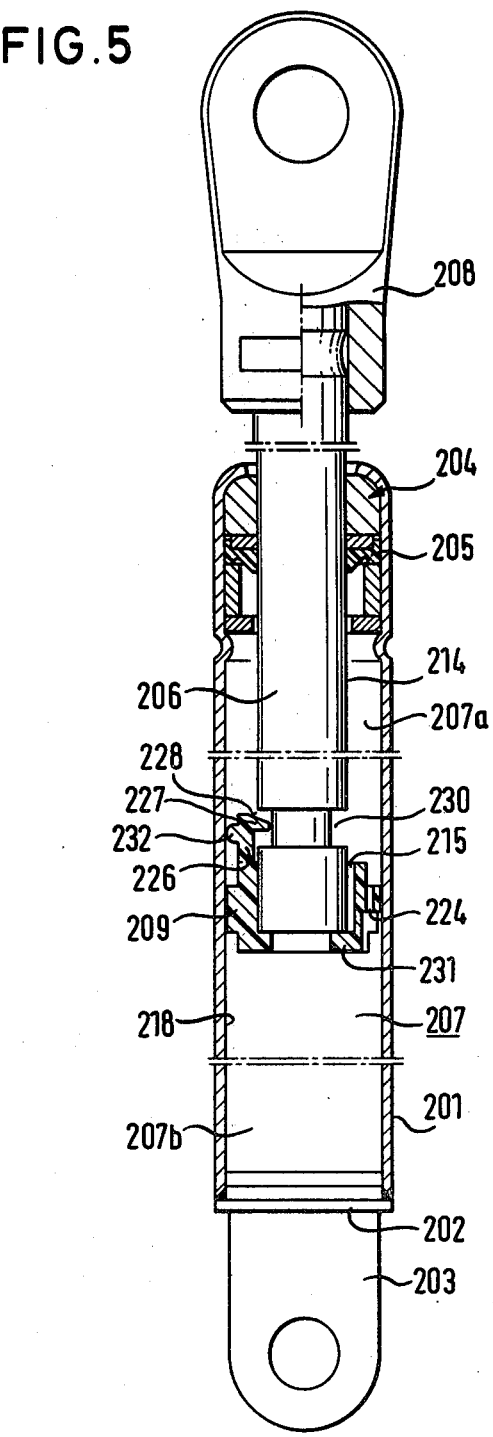
FIG. 5 is a longitudinal sectional view of a third embodiment of the invention.

In the embodiment of FIG. 5, analogous parts are designated by the same reference numbers as in FIGS. 1 to 3, increased by 200, and except as otherwise noted is the same in structure and function as the embodiment of FIG. 4. In the embodiment of FIG. 5, the tongues 226 are directed upwards from the piston unit 209 and engage an annular engagement groove 230 machined in the outer circumferential face 214 of the piston rod member 206. At the lower end of the piston unit 209, there is provided a radially inward directed flange 231 for cooperating with the end face of the piston rod 206 to open and close the lower ends of the channels 215 in dependence on the direction of movement of the rod 206 relative to the cylinder. In assembling the embodiment of FIG. 5, the piston unit 209 is mounted on the piston rod member 206 outside the cavity 207 by axially sliding the piston unit 209 along the piston rod member 206 from the lower end thereof until the abutment members 227 snap into the groove 230. The piston rod member 206 is then inserted into the cavity 207. Radially outward directed projections 232 provided on the tongues 226 prevent accidental release of the engagement between the abutment members 227 and the circumferential engagement groove 230 by cooperating with the internal circumferential face 218 of the cylinder member 201 to hold the abutment members within the groove 230. It will be noted that the groove 230 is of sufficiently axial width to allow the necessary axial movement of the piston unit 209.

Although the invention has been described herein by reference to various representative embodiments thereof, it will be understood by those skilled in the art that many variations and modifications of such embodiments may be made without departing from the inventive concepts disclosed. For instance, while the piston unit 9, 109, 209 advantageously is mounted on the piston rod member 6, 106, 206 for axial displacement relative thereto, it need not be so mounted, particularly where a differential damping rate is not desired. In such case, the tongues 26, 126, 226 could be dimensioned to snap snugly behind or into the engagement disc or groove, as the case may be, and retain the piston unit on the piston rod member in a substantially axially-fixed manner. All such variations and modifications, therefore, are intended to be included within the spirit and scope of the appended claims.

I claim:

1. In a cylinder-piston device including a cylinder member having a longitudinal axis and two ends, a cavity being defined within said cylinder member, a fluid within said cavity, a piston rod member axially movable with respect to said cylinder member and extending in sealing relation through at least one end thereof, and a piston unit mounted on said piston rod member within said cavity for axial movement therewith relative to the cylinder member, the improvement comprising:

first and second cooperative engagement means carried by said piston rod member and by said piston unit, respectively, for releasably mounting said piston unit on said piston rod member, at least one of said first and second engagement means being radially displaceable relative to the longitudinal axis of said cylinder, when said piston unit is located outside said cylinder, between a first radial position, at which said one means is engaged with said other engagement means to connect said piston unit to said piston rod member, and a second radial position, at which said one means is disengaged from said other engagement means to permit the mounting of said piston unit to said piston rod member.

2. The cylinder-piston device of claim 1, wherein the improvement further comprises means carried in part by said piston rod member and in part by said piston unit for centering said piston unit on said piston rod member.

3. The cylinder-piston device of claim 2, wherein the part of said centering means carried by said piston rod member is defined by the circumferential face of said piston rod member and the part of said centering means carried by said piston unit is defined by a central bore in said piston unit, said piston rod member being received within said bore when said piston unit is mounted on said piston rod.

4. The cylinder-piston device of claim 1, wherein said one engagement means includes means for resiliently resisting radial displacement of said one engagement means from said first position to said second position, whereby said one engagement means is normally biased towards said first position.

5. The cylinder-piston device of claim 1, further comprising means for holding said one engagement means against radial displacement from said first position to said position when said piston unit is inside said cylinder member.

6. The cylinder-piston device of claim 5, wherein said holding means comprises the inner cylindrical face of said cylinder member.

7. The cylinder-piston device of claim 1, wherein said one engagement means is carried by said piston unit.

8. The cylinder-piston device of claim 7, wherein said piston unit comprises a piston body of resilient material, said second engagement means being integrally formed with said piston member.

9. The cylinder-piston device of claim 8, wherein said second engagement means comprises at least one substantially axially directed tongue member, each said tongue member having a first end integral with said piston body and a free second end which is radially displaceable from said first radial position to said second radial position, said free second end being provided with a radially-directed abutment member for engaging said first engagement means when said free end is at said second position.

10. The cylinder-piston device of claim 9, wherein each said abutment member is directed in a radial inward direction from the second end of said each tongue member.

11. The cylinder-piston device of claim 10, wherein said first engagement means comprises an annular engagement member provided on said piston rod member and protruding in the radial direction beyond the circumferential face of said piston rod member.

12. The cylinder-piston device of claim 11, wherein said annular engagement member is located axially between an axially-directed abutment face on said piston body and said radially inward directed abutment member of said tongue.

13. The cylinder-piston device of claim 11, wherein said annular engagement member is positioned in a circumferential positioning groove in the surface of said piston rod member.

14. The cylinder-piston device of claim 10, wherein said first engagement means comprises a circumferential engagement groove in the surface of said piston rod member.

15. The cylinder-piston device of claim 14, wherein said radially inward directed abutment member extends into said circumferential engagement groove so as to be located axially between the axially terminal faces thereof.

16. The cylinder-piston device of claim 9 wherein said resilient material comprises a plastic material.

17. The cylinder-piston device of claim 7 further comprising means carried in part by said piston rod member and in part by said piston unit for preliminarily deflecting said one engagement means to said second position when said piston unit is urged axially onto said piston rod member when said piston unit is outside said cylinder member.

18. The cylinder-piston device of claim 1, wherein said piston unit sealingly engages the inner surface of said cylinder member and defines first and second fluid chambers within said cavity and fluid passage means are provided between said fluid chambers; and wherein the improvement further comprises:
first and second engagement means including means for permitting said piston unit to move axially relative to said piston rod member between first and second terminal positions; and
cooperative means carried in part by said piston unit and in part by said piston rod member for defining two different flow cross sectional areas of said fluid passage means when said piston unit is in said first and second terminal positions, respectively.

19. The cylinder-piston device of claim 18, wherein said fluid passage means comprises at least one substantially axially directed fluid channel extending through said piston unit; and said cooperative means include cooperating first and second flow cross section defining faces on said piston rod member and said piston unit, respectively, said cross section defining faces being in engagement with each other in one of said terminal positions to close said at least one fluid channel and being out of engagement in the other of said terminal positions to open said at least one flow channel.

20. The cylinder-piston device of claim 19, wherein said second cross section defining face is defined by an annular rib provided on said piston body and shaped integrally therewith.

21. The cylinder-piston device of claim 19, wherein said piston body is provided with an annular sealing lip shaped integrally therewith and engaging the inner circumferential surface of said cylinder member, whereby said piston unit is moved between said first and second terminal positions by virtue of frictional engagement of said sealing lip with the cylinder surface whenever the direction of movement of said piston rod member is changed.

22. A method of assembling a cylinder-piston device of the type including a cylinder member, a piston rod member axially movable relative to the cylinder member and extending through at least one end of the cylinder, a piston unit mounted on said piston rod for movement therewith relative to the cylinder member, and
first and second cooperative engagement means carried by said piston rod member and by said piston unit, respectively, for releasably mounting said piston unit on said piston rod member, at least one of said first and second engagement means being radially displaceable relative to the longidutinal axis of said cylinder when said piston unit is located outside said cylinder but not when inside said cylinder, between a first radial position, at which said one means is adapted to engage said other engagement means, and a second radial position at which said one means is adapted to be disengaged from said other engagement means to permit the mounting of said piston unit on said piston rod member, comprising the steps of:
displacing said first engagement means from said first radial position to said second radial position while said piston unit is outside said cavity;
sliding said piston unit axially onto said piston rod member until said first and second engagement means are in position to be engaged;

* * * * *

UNITED STATES PATENT AND TRADEMARK OFFICE
CERTIFICATE OF CORRECTION

PATENT NO. : 4,307,873

DATED : December 29, 1981

INVENTOR(S) : Werner Mölders

It is certified that error appears in the above-identified patent and that said Letters Patent are hereby corrected as shown below:

First page, Heading and Item [75] "Möders" should read --Mölders--;

First page, 4th-from-bottom line of ABSTRACT, "slidably" should read --slidable--;

Col. 1, line 9, "hydropenumatic" should read --hydropneumatic--;

Col. 1, line 11, "to and" should be --to an--;

Col. 10, line 36, "longidutinal" should read --longitudinal--;

Col. 10, following line 51, insert:

-- allowing said first engagement means to return to said first radial position in engagement with said second engagement means; and

UNITED STATES PATENT AND TRADEMARK OFFICE
CERTIFICATE OF CORRECTION

PATENT NO. : 4,307,873

DATED : December 29, 1981

INVENTOR(S) : Werner Molders

It is certified that error appears in the above—identified patent and that said Letters Patent is hereby corrected as shown below:

inserting said combined piston rod-piston unit assembly into said cylinder through an end thereof to secure the engagement of said first engagement means in said first radial position. --.

Signed and Sealed this

Sixth Day of July 1982

[SEAL]

Attest:

Attesting Officer

GERALD J. MOSSINGHOFF

Commissioner of Patents and Trademarks